(12) United States Patent
Farchi et al.

(10) Patent No.: US 7,272,752 B2
(45) Date of Patent: Sep. 18, 2007

(54) METHOD AND SYSTEM FOR INTEGRATING TEST COVERAGE MEASUREMENTS WITH MODEL BASED TEST GENERATION

(75) Inventors: Eitan Farchi, Pardes Hana (IL); Daniel Geist, Haifa (IL); Alan Hartman, Haifa (IL); Paul Kram, Lowell, MA (US); Kenneth Nagin, D. N. HaMovil (IL); Yael Shaham-Gafni, Cupertino, CA (US); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 09/946,237

(22) Filed: Sep. 5, 2001

(65) Prior Publication Data

US 2003/0046613 A1    Mar. 6, 2003

(51) Int. Cl.
*G06F 11/00* (2006.01)
(52) U.S. Cl. .......................................... 714/38; 714/37
(58) Field of Classification Search ................ 714/38, 714/37, 25
See application file for complete search history.

(56) References Cited

U.S. PATENT DOCUMENTS

| | | | |
|---|---|---|---|
| 5,463,770 A | 10/1995 | Todd | 395/600 |
| 5,708,774 A | 1/1998 | Boden | 395/183.14 |
| 5,754,760 A | 5/1998 | Warfield | 395/183.14 |
| 5,758,061 A * | 5/1998 | Plum | 714/35 |
| 5,862,364 A | 1/1999 | Todd | 395/500 |
| 5,913,023 A | 6/1999 | Szermer | 395/183.14 |
| 5,918,037 A | 6/1999 | Tremblay et al. | 395/500.03 |
| 5,999,717 A | 12/1999 | Kaufmann et al. | 395/500.23 |
| 6,002,869 A * | 12/1999 | Hinckley | 717/124 |
| 6,002,871 A * | 12/1999 | Duggan et al. | 717/135 |
| 6,074,426 A | 6/2000 | Baumgartner et al. | 703/13 |
| 6,128,759 A | 10/2000 | Hansen | 714/738 |

(Continued)

OTHER PUBLICATIONS

Aegdis—Automated Generation and Execution of Test Suites for Distributed Component Based Software, Project Proposal—Part B, pp. 1-38, printed May 23, 2000.

(Continued)

*Primary Examiner*—Yolanda L. Wilson
(74) *Attorney, Agent, or Firm*—Synnestvedt & Lechner LLP; Jeanine Ray

(57) ABSTRACT

A test coverage tool provides output that identifies differences between the actual coverage provided by a test suite run on a program under test and the coverage criteria (e.g., the coverage criteria required by the test/development team management). The output from the test coverage tool is generated in the same language that was used to write the coverage criteria that are input to an automated test generator to create the test cases which form the test suite. As a result, the output from the coverage tool can be input back into the automated test generator to cause the generator to revise the test cases to correct the inadequacies. This allows iterative refinement of the test suite automatically, enabling automated test generation to be more effectively and efficiently used with more complex software and more complex test generation inputs.

In preferred embodiments, test coverage analysis results of several different test suites, some manually generated and others automatically generated, are used to produce a streamlined automatically-generated test suite and/or to add missing elements to an automatically generated test-suite.

25 Claims, 4 Drawing Sheets

U.S. PATENT DOCUMENTS

| | | | |
|---|---|---|---|
| 6,212,675 B1 | 4/2001 | Johnston et al. | 717/4 |
| 6,243,835 B1* | 6/2001 | Enokido et al. | 714/38 |
| 6,279,124 B1* | 8/2001 | Brouwer et al. | 714/38 |
| 6,611,955 B1* | 8/2003 | Logean et al. | 717/128 |
| 6,654,911 B1* | 11/2003 | Miles | 714/38 |
| 6,804,634 B1* | 10/2004 | Holzmann et al. | 703/2 |
| 2003/0135792 A1* | 7/2003 | Chen | 714/38 |
| 2004/0015861 A1* | 1/2004 | Nagalkar | 717/124 |

OTHER PUBLICATIONS

Aegdis—Automated Generation and Execution of Test Suites for Distributed Component Based Software, Project Proposal—Part C, pp. 1-20, printed May 23, 2000.

Gronau et al., IBM Research Laboratory in Haifa Technical Report, "A Methodology and Architecture for Automated Software Testing," pp. 1-17, 2000.

"Syntax of GDL Foci, GOTCHA TCBeans," IBM Haifa Research Laboratory.

"SPIN'2000", The 7th Intl. SPIN Workshop on Model Checking of Software, Stanford University, CA, Aug. 30-31, Sep. 1, 2000, pp. 1-4, printed Jun. 6, 2000.

"A Fully Abstract Model for Concurrent Nondeterministic Processes Based on Posets with Non-Actions," http://www.informatik.uni-hamburg.de/TGI/pnib/c/cherkasova_12.html, printed Jun. 5, 2000.

SPIN99—Papers from the 5th Intl. SPIN Workshop, http://netlib.bell-labs.com/netlib/spin/ws99a/program99.html, printed Jun. 6, 2000.

SCARP, http://icee.cs.umass.edu/SCARP.htm, pp. 1-5, printed Jun. 5, 2000.

"On-the-Fly, LTL Model Checking with SPIN," http://hetlib.bell-labs.com/netlib/spin/watispin.html. pp. 1-4, printed Jun. 6, 2000.

Gallardo and Merino, "A Framework for Automatic Construction of Abstract Promela Models," (no date available).

Dwyer and Pasareanu, "Model Checking Generic Container Implementations," http://www.cis.ksu.edu/~dwyer/papers/containermc.t, printed Jun. 6, 2000.

U.S. Appl. No. 09/847,309, "Technique Using Persistent Foci for Finite State Machine-Based Test Generation," filed May 31, 2001.

Carver & Tai, "Use of sequencing constraints for specification-based testing of concurrent program," IEEE Transactions of SW Engineering, vol. 24, No. 6, pp. 471-490 (Jun. 1998).

Hartman et al., "Model Driven Testing—AGEDIS Architecture Interfaces and Tools," *Proceedings of the 1st European Conference on Model Driven Software Engineering*, pp. 1-11, Nuremburg (2003).*

"Aegdis—Architecture, Interfaces & Tools," Slide Presentation from *1st European Conference on Model Driven Software Engineering*, Nuremburg (Dec. 11-12, 2003) [pp. 1-7 only; CD enclosed with complete presentation in .pdf format].*

* cited by examiner

METHOD AND SYSTEM FOR INTEGRATING TEST COVERAGE MEASUREMENTS WITH MODEL BASED TEST GENERATION

FIELD OF THE INVENTION

The present invention relates in general to the field of software testing, and more particularly, to an improved method and system for integrating test coverage tools with automatic and manual test generation tools.

BACKGROUND OF THE INVENTION

Manual test generation methods have existed for several years in which testers manually evaluate a software system to be tested (referred to herein as "the program under test"), write test cases based on the evaluation that will test various aspects of the software system, combine the test cases to form a single test or a "test suite" (hereinafter referred to as a "test suite"), review the test coverage after running the test suite on the program under test to determine the adequacy of the test suite, and then refine the test suite by revising existing test cases of, or adding additional test cases to, the test suite.

The above-described process of generating a suitable test suite is an iterative process which begins by the identification of "coverage criteria." Coverage criteria typically comprise an informal list of tasks to be accomplished by the test suite. This may be a subset of states, transactions, or paths within the software under test that need to be covered by the test suite. Next, the tester writes the test cases to cover the coverage criteria. The test cases are individual programs which carry out the tasks to be accomplished as identified by the coverage criteria. The programs which make up the test cases typically will be coded instructions which, when input to the program under test, will cause the program to take some action which "exercises" a portion of the program under test to see if it works. In addition, a particular test case may also include coded instructions that will verify the expected response to these actions. For example, if one of the coverage criterion for testing a word processing program is to test the print function, then a test case written to test this function might include instructions which would cause the word processing program to open a particular file, select the print function, display a "print properties" dialog box (this is an example of an expected response), select a particular print function (e.g., print the current page), and issue the print command to the printer port.

As part of the testing process, the software under test is modified to output a test trace during the running of the test suite in a well-known manner. This test trace may be a list of the states of the application under test after the execution of each step in the test case, and it may also include other details of the test execution path, including a list of procedures called, processes spawned, and the like. This test trace is input to a "coverage tool", such as FOCUS™ by IBM and compared with the coverage that was expected as identified by the coverage criteria. Both the test trace and the coverage criteria are input to the test coverage tool in a language (i.e., code) compatible with the coverage tool. A test coverage report is generated listing which elements of the desired coverage were actually covered and which elements of the desired coverage were not covered. The test engineer will then take this test coverage report, analyze it and, based on this analysis, refine the test suite, typically by adding more test cases or revising existing test cases in the test suite.

While this method works adequately for testing simple programs, as the software programs being tested become more complex, the process of developing and refining the test program becomes unwieldy.

Test suites developed using this manual method are typically very thorough in that many hours of thought goes into the process of developing them. Even though the primary focus of the test suite development pertains to the areas identified by the coverage criteria, because a human being (the tester or developer) is involved in the process from beginning to end, the final test program benefits from the insight and intuition of the human being. However, as a product matures and goes through several testing cycles these manually-coded test suites can grow to contain thousands of test cases. Test cases may be added as the test suite is refined and as more function is added to the program under test, and many times the added test cases contain redundant or otherwise unnecessary elements that may go unnoticed due to the sheer size of the test suite. This problem becomes worse as the complexity of the software being tested increases.

To speed up the process of generating test programs, more recently software testers have turned to automated test generators (e.g. Object Geode by Telelogic) which utilize both "behavioral models" and coverage criteria to automatically generate the test programs. The behavioral model is a formal description of part of the behavior of the software under test, and this behavioral model can be utilized by an automated test generator to generate a test suite according to separately defined coverage criteria.

The behavioral models are typically designed to identify and generate test cases to exercise portions of the program under test using an abstraction tailored to that specific purpose. The behavioral models represent the properties of the system as viewed through the lens of the abstraction; these properties are referred to herein as the "properties of interest" and represent only the aspects which are the focus of the behavioral model. All details outside of the focus of the abstraction are omitted from the behavioral models. The use of such abstractions is necessary due to the so-called "state explosion" problem often encountered in model-based test generation. When modeling complex software in any detail, the state explosion problem often causes automated test generators to fail to generate test cases using a reasonable amount of computing resources (time and storage space).

The coverage criteria serve to focus the test generator on aspects of the model that require an individual test case to be generated. For example, one coverage criterion might be directed solely towards a method of selecting a port of a particular server being accessed using the software under test; another coverage criterion might be directed solely towards testing the various methods of designating an IP address of a particular server using the software under test. While each of these coverage criteria function appropriately for the specific task with which they are associated, the overall testing of a software program using test suites based on these specific combinations of coverage criteria and behavioral models may suffer from their narrow focus, since no other aspects will be tested.

In a typical use of an automated test generator, a test engineer writes behavioral models in a formal modeling language (also known as a "functional coverage modeling language") that is "understood" by the automated test generator being used. For example, test engineers may use finite state machines to model externally observable behavior of a program under test. They then input the models and coverage criteria to an automated test generator to generate test cases that are combined to form the test suite. There are many well-known methods of this type (and functional coverage modeling languages) as disclosed in commonly assigned co-pending U.S. patent application Ser. No. 09/847,309 entitle "Technique Using Persistent Foci for Finite State Machine-Based Test Generation," filed on May 31, 2001, incorporated herein fully by reference.

As with manual systems, when the program under test is tested by the test suite, a test trace is output which is input to a coverage tool and compared with the expected coverage, and a test coverage report is generated, analyzed, and if changes are deemed necessary, the test engineer will manually refine the test suite by modifying the behavioral model.

Automatically generated test suites are not without their problems. Sometimes the coverage criteria used with the behavioral models may conflict with each other. For example, in finite-state-machine-based test generation, one coverage criterion may be to reach, in at least one generated test, all of the states of the system-to-be-tested that are represented in the behavioral model. A second coverage criteria may be that none of the generated tests shall enter one specific "forbidden" state represented in the behavioral model. These goals (i.e., "reach all states" vs. "never reach forbidden state") conflict in that they cannot both be completely satisfied at the same time. To achieve a compromise, one goal must take precedence over the other, and some automated test generators are configured to default to the most restrictive or least restrictive option.

For example, assume a simple client program for opening a connection to a server, with there being four distinct methods of making the connection. Specifically, assume that the client program can use either a numeric IP address or a domain name to identify the IP address being requested by the server. In addition, assume that the client program must identify a particular port for access to the server, using either a default port or a user-specified port. One coverage criterion for testing this client program might have all four possible states occurring (i.e., numeric IP/default port; domain name/default-port; numeric IP/user-specified port; and domain name/user-specified port). Another coverage criterion might specify that the default port should never be specified (i.e., any test state that would require use of the default port is a "forbidden state"). In this example, if the automated test generator is configured to favor a more restrictive test over a less restrictive test, the default port connection method will not be tested, possibly leading to an incomplete test of the software system.

The problem is magnified as the test engineer specifies more coverage criteria to the test generator, since the conflicts (and the unforeseen side-effects resulting from the method of resolution of conflicts used by the automated test generator) quickly multiply.

To summarize, while each of the test generation methods (manual and automatic) have their advantages and drawbacks, improving the programs that they generate is desirable but still requires the manual analysis of the test coverage report output by the test coverage tools and the subsequent repetition of the original process, albeit in more condensed form, to create better tests.

Accordingly, it would be desirable to have available a method and system which would integrate test coverage measurement with model-based test generation so that the results developed by the test coverage measurements can be input directly to an automated test generator, thereby realizing automated test improvement capability.

SUMMARY OF THE INVENTION

The present invention addresses the increasing complexities in testing computer systems by integrating test coverage measurement with model-based test generation such that imperfections in a test suite can be automatically and easily corrected. A test coverage tool provides output that identifies differences between the actual coverage provided by a test suite run on a program under test and the coverage criteria (e.g., the coverage criteria required by the test/development team management). According to the present invention, the output from the test coverage tool is generated in (or converted to) the same language that was used to write the coverage criteria that are input to an automated test generator to create the test cases which form the test suite. As a result, the output from the coverage tool can be input back into the automated test generator to cause the generator to automatically revise the test cases (or write new test cases) to correct the inadequacies. This allows iterative refinement of the test suite automatically, enabling automated test generation to be more effectively and efficiently used with more complex software and more complex test generation inputs.

In preferred embodiments, test coverage analysis results of several different test suites, some manually generated and others automatically generated, are used to produce a streamlined automatically-generated test suite and/or to add missing elements to an automatically generated test-suite.

DETAILED DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies the present invention, is typically stored in permanent storage of some type, such as a computer readable medium. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 1:
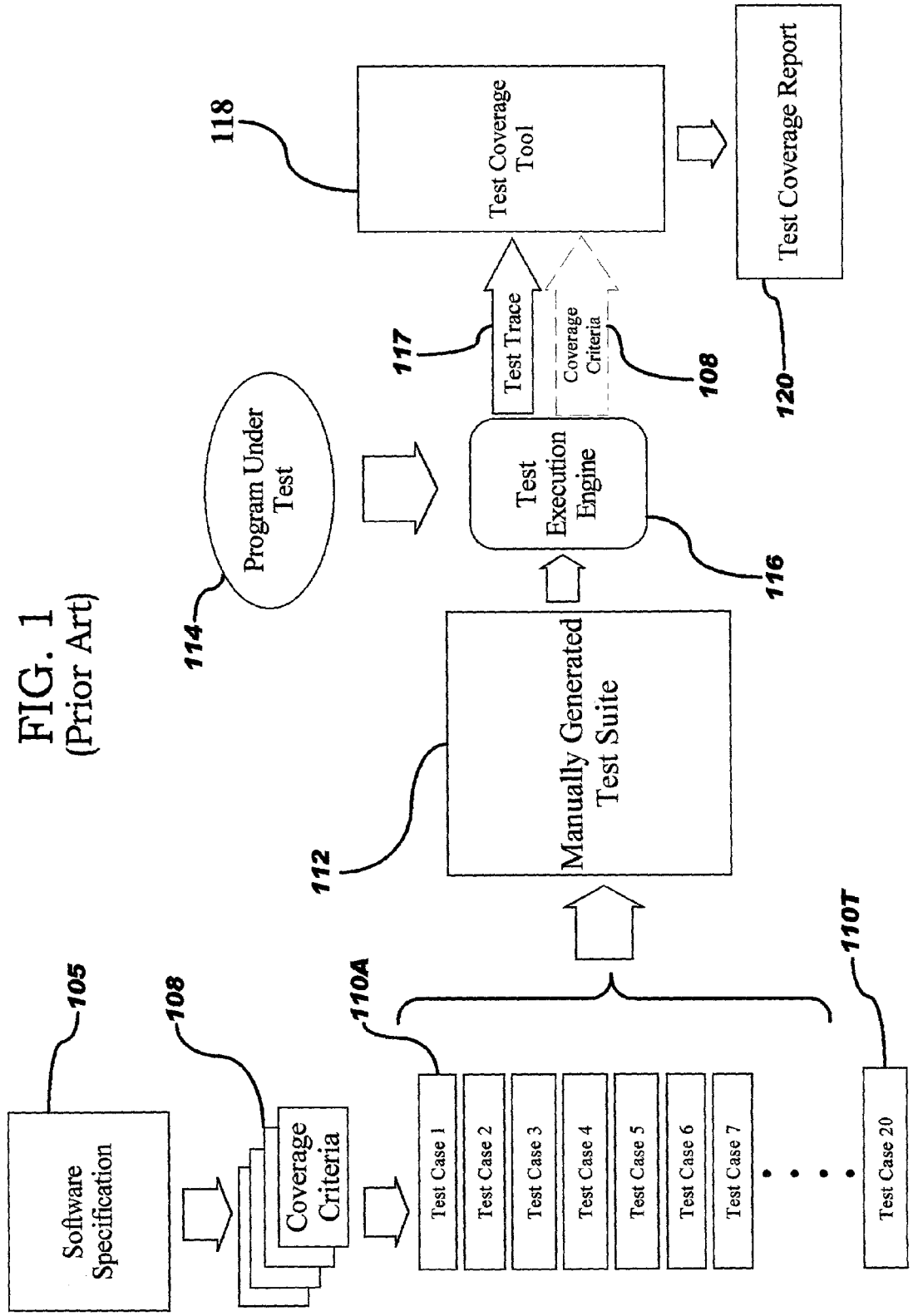
FIG. 1 is a general flow diagram illustrating the basic process of conventional manual test generation.

FIG. 1 is a general flow diagram illustrating the basic process of conventional manual test generation. Referring to FIG. 1, a software specification 105 for a program under test 114 is studied by a test engineer or software developer and is used to derive coverage criteria 108 for testing the program under test. The coverage criteria 108 is either an implicit or explicit list of events and states that the software is expected to exercise during the running of a test suite being generated. Based on the coverage criteria 108, a series of test cases 110A-110T are written in a language compatible with a test execution engine 116 being used to cover the various aspects of the testing identified by the coverage criteria. While twenty test cases 110A-110T, are shown, it is understood that there is no maximum or minimum number of test cases that are needed; twenty are shown for purpose of example only. The test cases 110A-110T may be subroutines, lines of codes, "modules" comprising many lines of code, and the like. The test cases are combined to create a manually generated test suite 112.

The test suite 112 is run on the program under test 114 by inputting both to test execution engine 116. A test trace 117 is output which is essentially a report of events which occurred in the program under test 114 while a test case of the test suite 112 was being run. This test trace 117, along with the coverage criteria 108, is input to a coverage tool 118. Coverage tool 118 generates a test coverage report 120 which identifies the tasks or events on the list that actually occurred during the execution of the test suite 112, and how often they occurred, and which of these events were not covered (i.e., did not occur at all). Typically the test coverage report is generated as a table or chart. This report is then used by the test engineer to manually develop additional test cases or to revise existing test cases in the test suite 112.

Figure 2:
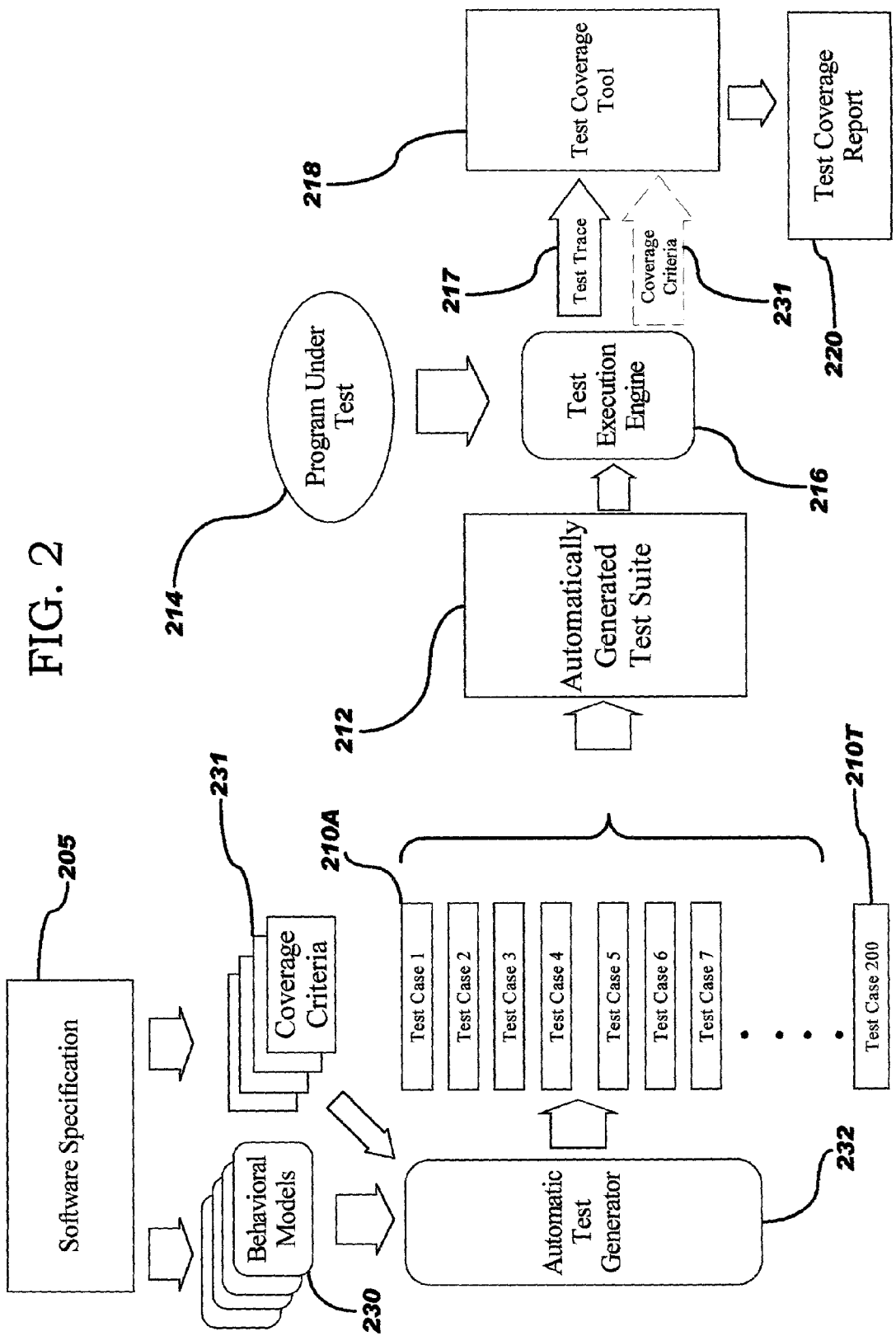
FIG. 2 is a general flow diagram illustrating the basic process of conventional automated test generation.

FIG. 2 is a general flow diagram illustrating the basic process of automated test generation as it exists in the prior art. Referring to FIG. 2, a software specification 205 for a program under test 214 is studied by a test engineer or a software developer and is used to derive behavioral models 230 and coverage criteria 231. As noted above, behavioral models are descriptions of the software at a high level of abstraction written in a formal language that can be utilized, together with a set of formal coverage criteria, by an automated test generator to generate a test suite. The behavioral models 230 and the coverage criteria 231 are input to an automated test generator 232, and in a known manner, the automated test generator 232 generates a series of test cases 210A-210T. These test cases 210A-210T are combined to form an automatically-generated test suite 212. Automatically-generated test suite 212 is run on the program under test 214 by inputting both to test execution engine 216. As with the manual process described with respect to FIG. 1, a test trace 217 is output identifying the coverage events that occurred or failed to occur while running the test suite 212. Coverage tool 218 generates a test coverage report 220 based on the test trace 217 and the coverage criteria 231 and this report is utilized to judge the suitability of the program under test 214. If additional aspects of the program under test need to be tested, then the test engineers will manually write additional models and/or coverage criteria to cover the additional aspects and generate new test cases to cover these aspects.

Figure 3:
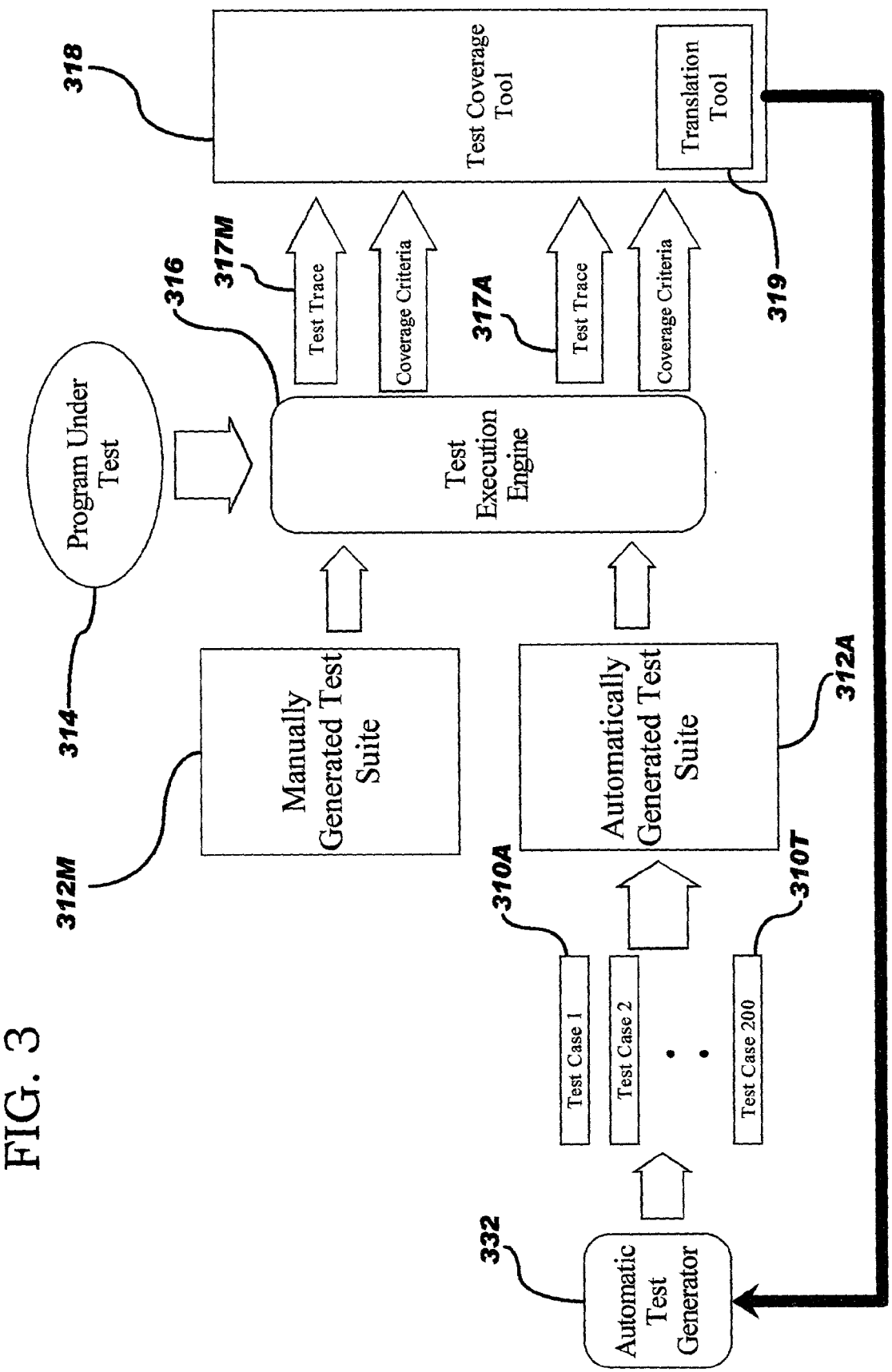
FIG. 3 is a general flow diagram illustrating the basic process of the present invention in which new coverage criteria, generated automatically by a coverage tool, is fed back to the automated test generator.

FIG. 3 is a general flow diagram illustrating the basic process of the present invention in which manual test generation techniques and automated test generation techniques are integrated with a test coverage tool to enable the iterative improvement process to be utilized with the automated test generation procedure. Aspects of manual test generation and automatic test generation, as described in connection with FIGS. 1 and 2 but which are not affected by the processes of FIG. 3, are omitted for simplicity.

Referring to FIG. 3, a manual test generation process as illustrated in FIG. 1 and an automated test generation process as illustrated in FIG. 2 are run in parallel. It should be understood that two test suites, a manually-generated test suite 312M and an automatically generated test suite 312A are shown for purposes of example only. Any number of test suites may be run through the test execution engine 316 against the program under test 314 and have their test trace and coverage criteria delivered to test coverage tool 318. Likewise, even a single automatically generated test suite 312A used as shown in FIG. 3 can take advantage of the present invention.

In accordance with the present invention, the test coverage report is output from test coverage tool 318 in the form of computer code using a language identical to the language utilized to write the coverage criteria 231 that are input to automated test generator 332. To accomplish this task, the coverage tool 318 must be configured to write its output in the formal language for coverage criteria understood by the test generator. For example, if the test generator is Object Geode, then the information pertaining to events that were not covered by the test will be translated, using known translation techniques, into a "test purpose diagram" which places the information in a form recognizable by Object Geode. Thus, a translation tool 319 is incorporated into (or is provided externally to) the test coverage tool to accomplish this task. Translation tool 319 can be, for example, a simple program that uses known translation techniques to convert the output of the test coverage tool to the language used by the test generator. As such, rather than requiring a test engineer or test developer to study the test coverage report and make manual modifications to the behavioral models and/or develop additional behavioral models, the automated test generator 332 receives the test coverage report in coded form which it then uses to automatically generate additional test cases 310A-310T and/or to modify existing test cases. The process then continues as described with respect to FIG. 2 and can continue iterating in this manner until the optimal test suite is developed.

As noted above, while not necessary for utilizing the benefits of the present invention, more than one test suite can be run against the program under test using test execution engine 316 and have its test trace and coverage criteria information input to test coverage tool 318. By inputting test traces from multiple test suites, test suites that are too restrictive and/or that are inefficient can be identified and additional criteria can be automatically created to correct these deficiencies.

The translation tool 319 is simply a tool that will convert the output of the test coverage tool into a format recognizable by the automatic test generator 332, such as XML format. Such translators are well known and can be implemented in software or hardware.

The following example illustrates the interaction between the test coverage tool and the automatic test generator. A typical coverage model might be structured <X, Y, Z>, where each variable X, Y, and Z represents an event to be covered and can take a value from 1 through 10. The list of tasks is given implicitly by directing the automatic test generator to cover all possible combinations of events of type <X,Y,Z>. Since each variable can take a value from 1 through 10, there are ten possible ways that events of type X could happen, ten possible ways that event Y could happen, and 10 possible ways that event Z could happen. Thus, there are a total of 1000 possible coverage tasks, e.g., (X1,Y1,Z1); (X1,Y1,Z2); (X1,Y1,Z3); . . . (X10,Y10,Z10). So the output from the test coverage tool might identify that the following combinations were not covered: (X4,Y7,Z10); (X6,Y8,Z10); and (X8,Y10,Z10) As long as the test generation tool can read input in the same language as that of the test report output from the test coverage tools (e.g., XML), then when the test generator receives (X4,Y7,Z10); (X6,Y8, Z10); and (X8,Y10,Z10) at its input, it will try to generate a test where these coverage tasks are satisfied.

Figure 4:
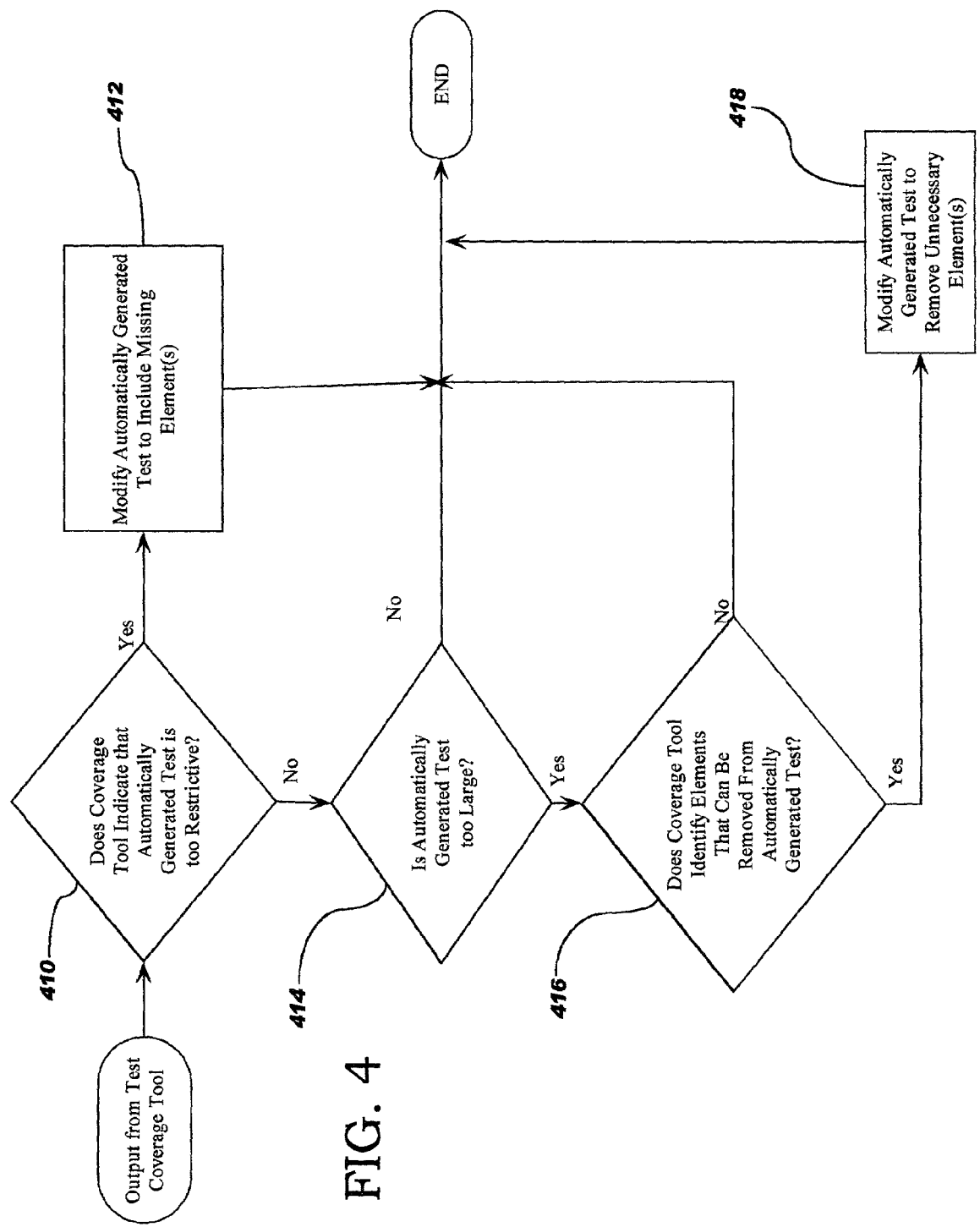
FIG. 4 is a flowchart illustrating a process for taking advantage of the present invention to automatically add missing elements or reduce redundant elements from a test program in accordance with the present invention.

FIG. 4 is a flowchart illustrating a process that can be followed in accordance with the present invention to accomplish the above-described benefits. At step 410, a determination is made as to whether or not a comparison of the test results from the two test suites 312M and 312A indicates that the coverage model used in generating the automatically-generated test was too restrictive. For example, using the earlier-discussed example pertaining to the opening of a connection to a server by a client program, if the behavioral model restricted the test to only consider states where a user-designated port is specified (i.e., specifying the default port is a "forbidden state"), and yet the manually generated test specified the default port and succeeded (i.e., "passed"), then the comparison shows this fact, and the test coverage tool 318 outputs an instruction (or set of instructions) in the language of the behavioral model which, when input to automated test generator 323, will cause it to generate a test case to cover this aspect and add that test case to the test suite 312A.

If it is determined that the behavioral model is not too restrictive (i.e., if the comparison does not identify aspects of the automatically-generated test which unnecessarily-limit the results obtained by the automatically-generated test), then at step 414 a determination is made as to whether or not the test suite is too large. This might occur when a particular coverage event occurs multiple times in the trace and the coverage of this event is more than is required.

If the determination is made that the test suite is not too large, then the process terminates. However, if a determination is made that the test suite is too large (and thus benefit could be gained from it being reduced in size), then at step 416, a determination is made as to whether or not the comparison identifies elements that are already covered by the manually-generated test suite 312M and thus do not have to be specified in the behavioral model used to generate the automatically generated test program 312A. Again, if there are such redundant elements, this information is output from the test coverage tool 318. The information on "over-covered" events produced by the coverage tool will contain a cross reference to the test cases which caused this over-coverage. It will also include a list of "essential" test cases—test cases which cover events not contained in any other test case. If a test case is not essential and causes over-coverage, then it can be deleted from the test suite.

Thus, by integrating test coverage tools with automated test generation tools in accordance with the present invention, redundant and/or missing coverage can be detected in tes suites, and any test suite can be optimized, automatically, either by identifying elements to add to the coverage model, or by identifying elements that need not be included in the test suite. This results in much more efficient test development and much better tests in general.

As noted above, the present invention can be embodied in software code utilizing standard programming techniques which will be readily apparent to one of ordinary skill in the art of computer programming.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of generating a test suite for testing computer software, comprising the steps of:
    running an existing test suite against said computer software and outputting a test trace;
    inputting said test trace to a test coverage tool and outputting a test coverage result file;
    inputting said test coverage result file to an automated test generator; and
    generating a final test suite based on said test coverage result file.

2. A method as set forth in claim 1, wherein said generating step comprises at least the steps of:
    evaluating said test coverage result file and identifying redundant test coverage in said existing test suite; and
    minimizing said redundant test coverage in said final test suite.

3. A method as set forth in claim 1, wherein said generating step comprises at least the steps of:
    evaluating said test coverage result file and identifying missing test coverage in said existing test suite; and
    including said missing test coverage in said final test suite.

4. A method of generating an improved test suite for testing computer software, comprising the steps of:
    running a plurality of test suites against said computer software and outputting test traces corresponding to each of said plurality of test suites;
    inputting said test traces to a test coverage tool and outputting a test coverage result file
    inputting said test coverage result file to an automated test generator; and
    generating an improved test suite based on said test coverage result file.

5. A method as set forth in claim 4, wherein said plurality of test suites are generated based on coverage criteria and/or behavioral models, and wherein said generating step comprises at least the steps of:
    evaluating said test coverage file and said coverage criteria and/or behavioral models to determine if any redundant test coverage exists by said plurality of test suites; and
    if redundant test coverage does exist, generating said improved test suite while minimizing said redundant test coverage.

6. A method as set forth in claim 4, wherein said plurality of test suites are generated based on coverage criteria and/or behavioral models, and wherein said generating step comprises at least the steps of:
    evaluating said test coverage file and said coverage criteria and/or behavioral models to determine if any test coverage is missing from said plurality of test suites; and
    if it is determined that test coverage is missing from said plurality of test suites, generating said improved test suite to include the missing test coverage.

7. A method of generating a final test suite for testing computer software, comprising the steps of:
    developing coverage criteria for said computer software in a first computer language;

developing behavioral models of said computer software in a second computer language;

inputting said coverage criteria and said behavioral models to an automated test generator to generate a preliminary test suite based on said coverage criteria;

running said preliminary test suite against said computer software and outputting a test trace;

evaluating the preliminary test suite by inputting said test trace and said coverage criteria to a coverage tool and outputting a coverage result file in said second computer language; and inputting said coverage result file to said automated test generator; and automatically generating a final test suite based on the evaluation of said preliminary test by said coverage tool.

8. A method as set forth in claim 7, wherein said first language is a functional coverage modeling language.

9. A method as set forth in claim 7, wherein said second language is a modeling language.

10. A method as set forth in claim 7, wherein said evaluating step comprises at least the step of:

determining if any redundant test coverage exists in said preliminary test suite; and if redundant test coverage does exist, identifying said redundant test coverage in said test trace.

11. A method as set forth in claim 10, wherein said generating step comprises at least the step of:

minimizing said redundant test coverage in said final test suite.

12. A method as set forth in claim 7 wherein said evaluating step comprises at least the step of:

determining if any test coverage is missing from in said preliminary test suite; and if any test coverage is missing, identifying said missing test coverage in said test trace.

13. A method as set forth in claim 12, wherein said generating step comprises at least the step of:

including said missing test coverage in said final test suite.

14. A method of detecting redundant test coverage in a test suite for testing computer software, comprising the steps of:

running a plurality of test suites against said computer software and outputting test traces corresponding to each of said plurality of test suites;

inputting said test traces to a test coverage tool and outputting a test coverage result file; and evaluating said test coverage result file to identify redundant test coverage from among said plurality of test suites.

15. A method as set forth in claim 14, further comprising the steps of:

inputting said test coverage result file to an automated test generator; and generating an improved test suite based on said test coverage result file.

16. A method as set forth in claim 15, wherein said plurality of test suites are generated based on coverage criteria and/or behavioral models, and said generating step comprises at least the steps of:

evaluating said test coverage file and said coverage criteria and/or behavioral models to determine if any redundant test coverage exists in the plurality of test suites; and if redundant test coverage does exist, generating said improved test suite while minimizing said redundant test coverage.

17. A method of detecting missing test coverage in a test suite for testing computer software, comprising the steps of:

running a plurality of test suites against said computer software and outputting test traces corresponding to each of said plurality of test suites;

inputting said test traces to a test coverage tool and outputting a test coverage result file; and evaluating said test coverage result file to identify missing test coverage from among said plurality of test suites.

18. A method as set forth in claim 17, further comprising the steps of:

inputting said test coverage result file to an automated test generator; and generating an improved test suite based on said test coverage result file.

19. A method as set forth in claim 18, wherein said plurality of test suites are generated based on coverage criteria and/or behavioral models, and wherein said generating step comprises at least the steps of:

evaluating said test coverage file and said coverage criteria and/or behavioral models to determine if any test coverage is missing from said plurality of test suites; and if it is determined that test coverage is missing from said plurality of test suites, generating said improved test suite to include the missing test coverage.

20. A system for generating a test suite for testing computer software, comprising:

means for running an existing test suite against said computer software and outputting a test trace;

means for inputting said test trace to a test coverage tool and outputting a test coverage result file;

means for inputting said test coverage result file to an automated test generator; and means generating a final test suite based on said test coverage result file.

21. A system as set forth in claim 20, wherein said generating means comprises at least:

means for evaluating said test coverage result file and identifying redundant test coverage in said existing test suite; and means for minimizing said redundant test coverage in said final test suite.

22. A system as set forth in claim 20, wherein said generating means comprises:

means for evaluating said test coverage result file and identifying missing test coverage in said existing test suite; and means for including said missing test coverage in said final test suite.

23. A computer program product in a computer-readable medium for generating a test suite for testing computer software, comprising:

computer-readable means for running an existing test suite against said computer software and outputting a test trace;

computer-readable means for inputting said test trace to a test coverage tool and outputting a test coverage result file;

computer-readable means for inputting said test coverage result file to an automated test generator; and computer-readable means generating a final test suite based on said test coverage result file.

24. A computer program product as set forth in claim 23, wherein said computer-readable generating means comprises at least:

computer-readable means for evaluating said test coverage result file and identifying redundant test coverage in said existing test suite; and computer-readable means for minimizing said redundant test coverage in said final test suite.

25. A computer program product as set forth in claim 23, wherein said computer-readable generating means comprises:

computer-readable means for evaluating said test coverage result file and identifying missing test coverage in said existing test suite; and computer-readable means for including said missing test coverage in said final test suite.

\* \* \* \* \*